Jan. 19, 1954   A. C. RUGE   2,666,262
CONDITION RESPONSIVE APPARATUS
Filed Feb. 21, 1948   4 Sheets-Sheet 1
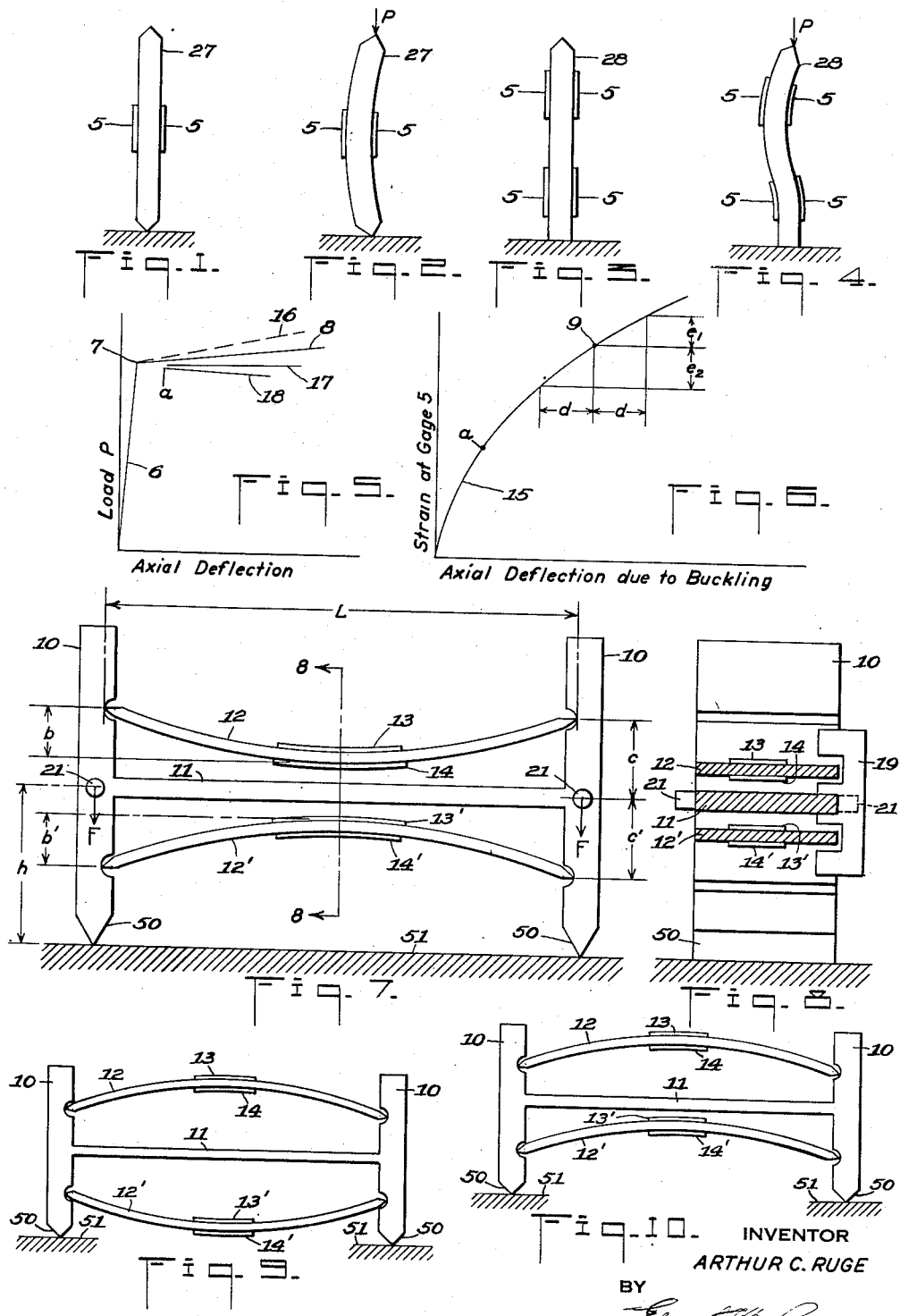
INVENTOR
ARTHUR C. RUGE
BY
ATTORNEY Jan. 19, 1954  A. C. RUGE  2,666,262
CONDITION RESPONSIVE APPARATUS
Filed Feb. 21, 1948  4 Sheets-Sheet 2
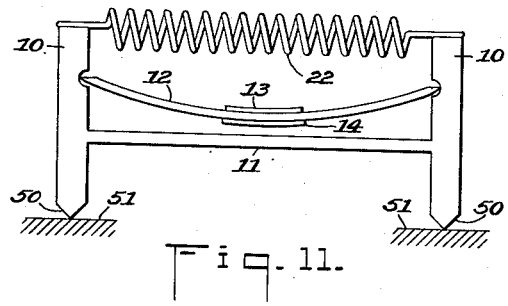
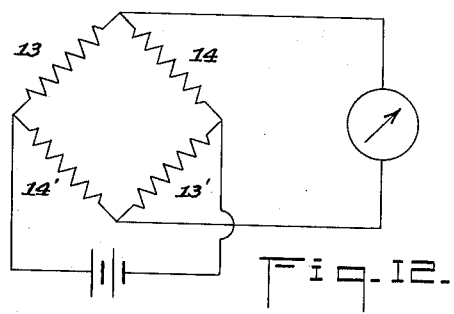
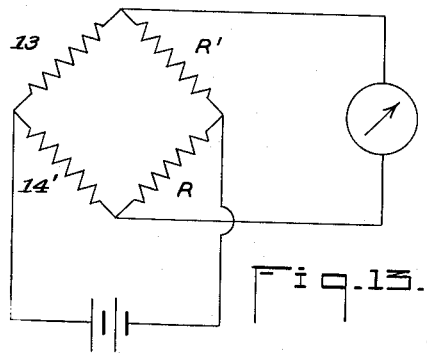
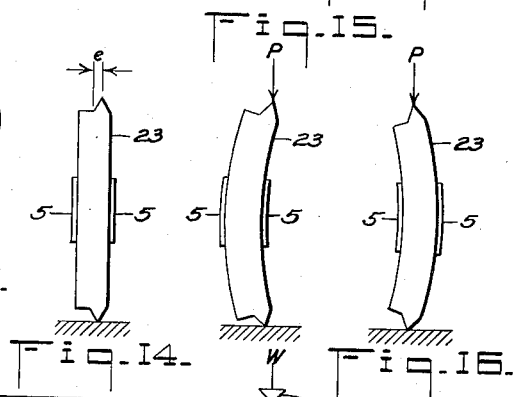
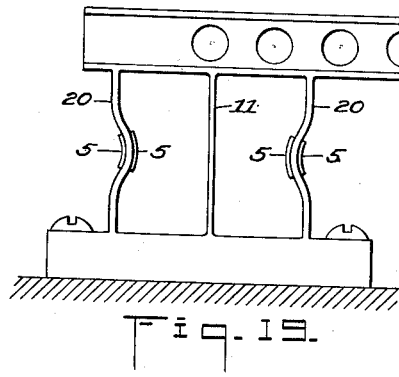
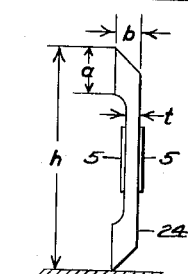
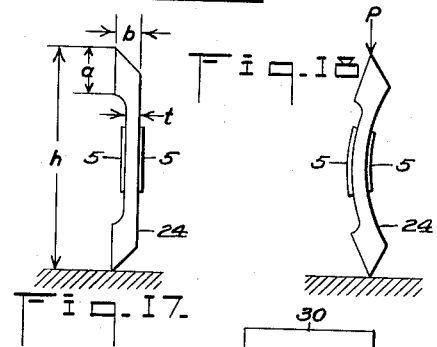
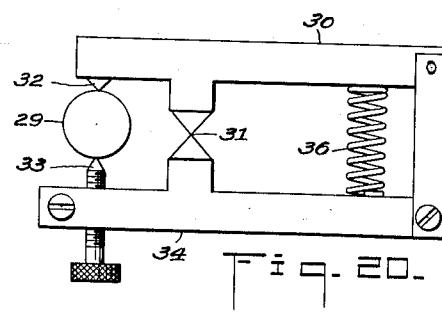
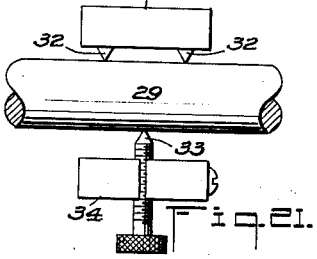
INVENTOR
ARTHUR C. RUGE
BY
*Edward T. McCaurry*
ATTORNEY

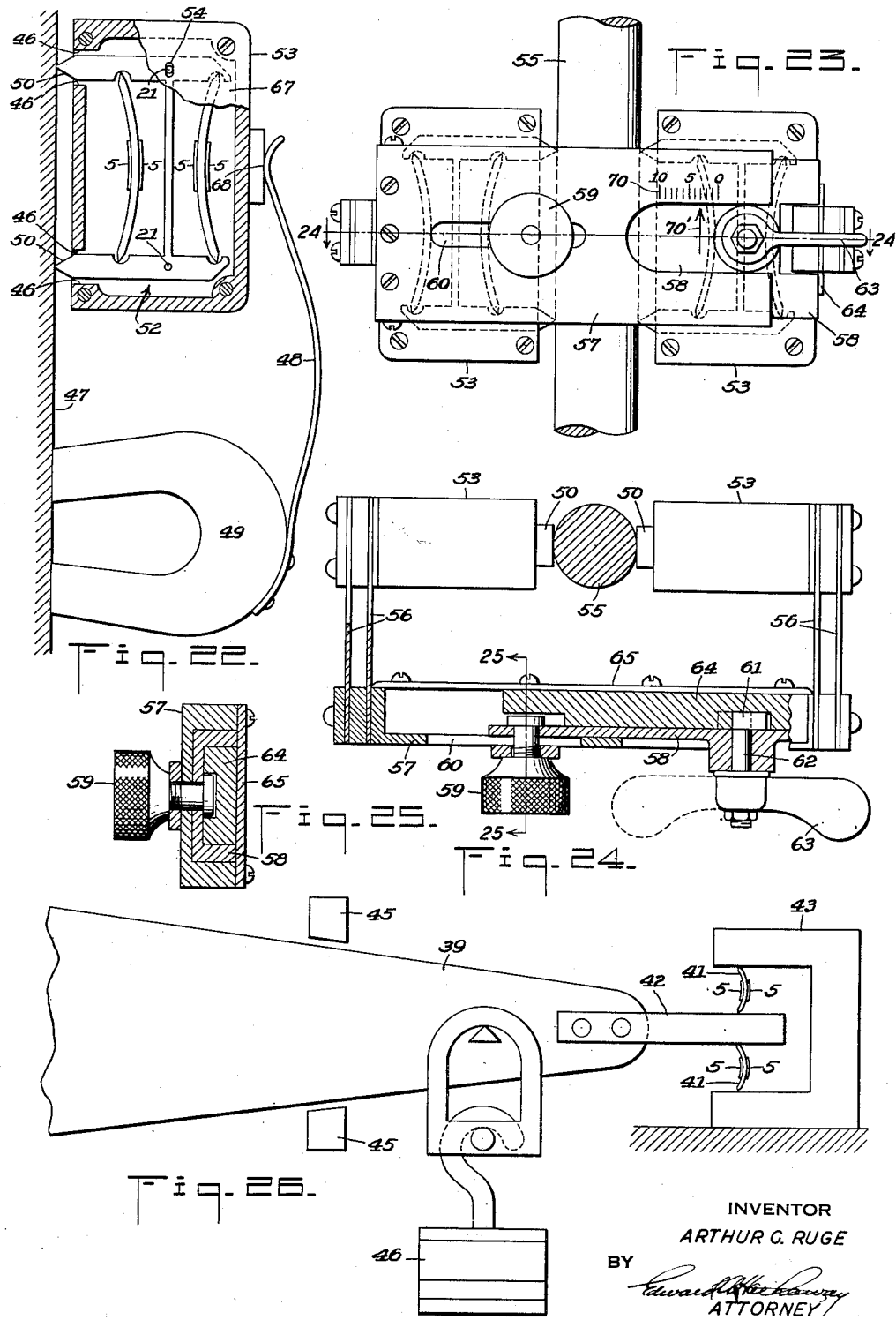

Jan. 19, 1954

A. C. RUGE 2,666,262

CONDITION RESPONSIVE APPARATUS

Filed Feb. 21, 1948

INVENTOR
ARTHUR C. RUGE
BY
ATTORNEY

Patented Jan. 19, 1954

2,666,262

UNITED STATES PATENT OFFICE 2,666,262

CONDITION RESPONSIVE APPARATUS

Arthur C. Ruge, Cambridge, Mass., assignor to Baldwin-Lima-Hamilton Corporation, a corporation of Pennsylvania Application February 21, 1948, Serial No. 10,112

11 Claims. (Cl. 33—148)

This invention relates generally to electrically sensitive condition responsive means and more particularly to weighing apparatus and to dimensional and displacement measuring devices.

One object of my invention is to provide improved means for increasing the sensitivity of such devices and apparatus in response to very small actuating forces.

Another object is to provide an improved attachable extensometer, employing the electrical resistance strain gage principle preferably the bonded wire type, wherein a high degree of sensitivity, accuracy and stability is achieved in response to very small actuating forces.

A further object of my invention is to provide improved means for conveniently and adjustably attaching an extensometer to a member under test and particularly for attaching an electrically averaging extensometer.

A still further object is to provide an improved lateral extensometer of a type adapted to employ the principles of my invention and accordingly obtain the benefits and advantages thereof.

A still further object of my invention is to provide an improved strain responsive member adapted to have minute deflections or movements caused by very small incremental actuating forces whereby said movements may readily be measured by electrical means; or whereby very small incremental forces or loads may be measured with a minimum movement resulting from the application of the incremental forces or loads. In accomplishing this object I employ a strain responsive member so arranged that it may be buckled under specified conditions of eccentric loading and the strain of such member measured by electrical responsive means.

Other objects and advantages will be more apparent to those skilled in the art from the following description of the accompanying drawings in which:

Figs. 1 to 4 are diagrammatic illustrations of buckling members showing the essentials of the buckling phenomenon that I employ in my invention;

Fig. 5 is a diagram showing the characteristic relationship between axial deflection and load for said buckling members;

Fig. 6 is a diagram showing the characteristic relationship between the strain at the point of attachment of a strain-responsive electrical resistance gage and the axial deflection of said buckling members;

Fig. 7 is a schematic illustration of an attachable extensometer employing buckling members;

Fig. 8 is a sectional view along line 8—8 of Fig. 7, showing in addition a safety stop that may be attached to said extensometer;

Figs. 9 to 11 are schematic illustrations of modifications of said extensometer;

Figs. 12 and 13 show circuit diagrams for use with said extensometer;

Figs. 14 to 16 are diagrammatic illustrations of an eccentric type buckling member adapted to be extremely sensitive to applied forces;

Figs. 17 and 18 are diagrammatic illustrations of a modified form of eccentric buckling member;

Fig. 19 is a schematic illustration of a weighing device employing my invention;

Figs. 20 and 21 are schematic front elevational and end views of a lateral extensometer or size-gaging device employing my invention;

Fig. 22 is a schematic illustration showing the application of a housing to said attachable extensometer and a means for attaching the extensometer to a specimen;

Figs. 23, 24 and 25 illustrate front, side and plan views of another means for attaching the attachable extensometer to a specimen;

Fig. 26 is a schematic illustration of a beam balance detector employing my invention;

Figure 27:
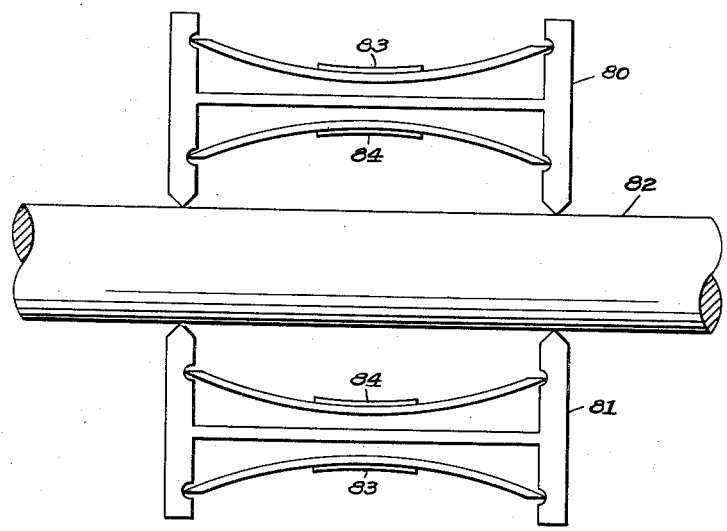

Fig. 27 schematically illustrates an arrangement of strain gages used with two of my improved extensometers when clamped to a specimen.

Figure 28:
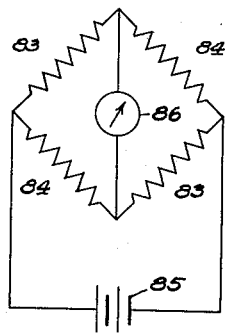
Figure 29:
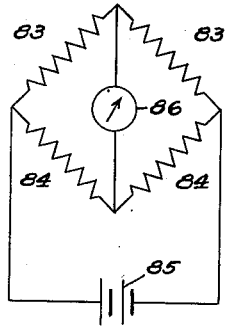

Fig. 28 is a circuit diagram for connecting the gages of Fig. 27 to obtain the average of the strains applied to the individual extensometers of Fig. 27; and Fig. 29 is a circuit diagram of the gages of Fig. 27 for measuring the difference between the strains applied to the two individual extensometers of Fig. 27, one application of which would be for measuring bending of a specimen.

In my Patents 2,316,975 and 2,416,664 I disclosed extensometers in which the strain to be measured is translated into bending of a member on which strain-responsive electrical resistance gages are mounted. While that structure is remarkably effective, and while it has already found considerable practical use, still it has the limitation that to obtain high sensitivity relatively high actuating forces are required. If an extensometer of the foregoing type is actuated through knife edges, the clamping pressure must therefore be relatively great in order to make high sensitivity possible, even though the sensitive element be made as flexible as possible by use of low-modulus material and minimum moment of inertia cross-section.

My improved extensometer has an entirely different principle although there is a superficial resemblance in that the indication is still in terms of the bending strain induced in a flexible member. However, I here have a pivotally balanced system arranged to employ the well known phenomenon of buckling and I utilize certain unique properties of this phenomenon in such a manner as to achieve a greatly improved result, as will presently appear. Before explaining the operating principles of my invention I shall first briefly outline the essential aspects of the buckling phenomenon as it relates to my invention.

In Figs. 1 and 2 I show a member 27, hinged at both ends, before and after buckling under a load P, while in Figs. 3 and 4 I show a member 28, fixed at one end and hinged at the other, before and after buckling under a load P. These two illustrations are sufficient to enable me to explain the essentials of the phenomenon in question. Electrical strain responsive gages 5 are applied to the buckling members.

Fig. 5 shows the characteristic relationship between axial deflection and load P for such buckling members as illustrated in Figs. 1 to 4 inclusive. As load P increases from zero the axial deflection increases at a very small rate as indicated by line 6. In this region the member is still straight and the axial deflection is due to longitudinal shortening of the member as a result of direct stress. As load P increases a point 7 is finally reached at which the condition known as buckling begins. If the load P is further increased it is found that the axial deflection increases at a very rapid rate as indicated by line 8. For purposes of explanation I have simplified Fig. 5 by indicating straight-line relationships. Actually, however, the function is slightly curved from point 7 onward but this detail need not concern us here.

Fig. 6 shows the characteristic relationship between the strain at gage 5 and the axial deflection of the member due to buckling. It will be noted that this function 15 is markedly non-linear, the non-linearity becoming more and more pronounced as the origin is approached. It may be seen that for a given axial deflection $d$ in either direction from a reference position it is possible to choose a given point 9 such that the corresponding strains $e1$ and $e2$ are very nearly equal. If the deflection $d$ is very small this condition can be met satisfactorily by operating near to the origin thus taking advantage of the very high sensitivity in that region. For large values of $d$ it is desirable but not necessary to choose point 9 farther out along the curve where the sensitivity is lower but where the linearity is better. In the description of Figs. 7 to 13 I shall explain how I partially compensate for such non-linearity as there is, by appropriate choice of circuit.

Having set forth certain elementary facts about buckling I shall now explain the principles of my invention. In Figs. 7 to 11 I show a practical embodiment in the form of an extensometer suitable for materials testing but also usable with slight modifications for many other measurement problems. Fig. 7 shows one preferred form of my extensometer in which I accomplish my delicate force-movement relationship by utilizing a pair of buckled elements 12 and 12' inserted in a structure having pivotally connected components so that the buckling forces are balanced against each other, it being understood that members 12 and 12' are forced into a state of elastic buckling as the expression "elastic buckling" is used in conventional theory of elasticity. The members 12 and 12' in their "free" state, as when removed from their supporting structure, would preferably be substantially straight or they may be initially curved if desired. The frame of my extensometer consists of two end plates 10 which are held in pivotally spaced relationship by a tension link or strap 11. Link 11 carries the resultant of the buckling forces acting on buckling members 12 and 12' on which are mounted strain responsive gages 13, 13', 14, and 14'. The buckling members are preferably terminated in points or knife edges which bear in suitably formed grooves in members 10. Pins 21 set into members 10 provide for the application of clamping forces F, Fig. 7, which hold the extensometer knife edges 50 against the surface 51 on which the strain measurement is to be made. Although many variations in the details may be made without departing from the spirit of my invention, Fig. 7 shows a practical application which I have actually built and tested. It will be seen that if the buckling forces acting on members 12 and 12' are identical and dimensions $c$ and $c'$ are equal then the system of forces is balanced and no external forces need be applied to hold the structure in its neutral position as shown in Fig. 7. If the buckling forces on 12 and 12' are not identical, either by design or by accident, then it is only necessary to choose $c$ and $c'$ such that the moments of the buckling forces are balanced about tension link 11. In my preferred design I make link 11 in the form of a flexible strap which is built into end members 10. Since strap 11 therefore has a certain resistance to bending, it is not necessary that the buckling forces be perfectly balanced in order to obtain stability. Even if member 11 is made in the form of a link which does not carry bending, it may be seen that any minor lack of balance of the buckling forces will merely cause the structure to assume a slightly different position of equilibrium.

In Figs. 9, 10 and 11, I show schematically other practical arrangements which may be used. Corresponding parts are given the same numbers as in Fig. 7. In Fig. 9 the members 12 and 12' are buckled outwardly relative to tension link 11 and in Fig. 10 they are buckled in the same direction. In Fig. 11 I show how the same function may be performed by a single buckling element 12 together with a spring 22 to provide a balanced set of forces when embodied in my pivotally connected structure.

In order to protect the extensometer from damage due to rough handling I may make use of a safety stop such as is shown schematically as 19 in Fig. 8. Such a stop may be attached to member 11 or it can equally well be attached to one of the end plates 10. I have also found it practical to use member 11 itself as the stop in which case excessive buckling of members 12 or 12' is prevented when contact with member 11 is established.

Figs. 12 and 13 show practical circuit arrangements for use with my extensometer as exemplified in Figs. 7 to 10 inclusive. In Fig. 12 I make use of four strain gages 13, 13', 14 and 14' which are all active and therefore obtain a high sensitivity whereas in Fig. 13 I make use of only two strain gages 13 and 14', or alternatively 13' and 14, completing the bridge circuit with two resistors R and R'. It is obviously possible to make the measurements with any one strain gage attached to one of the buckling members but I prefer the arrangements shown in Figs. 12 and 13 for reasons of linearity as will be explained below.

Considering Fig. 13 in conjunction with Fig. 6 and noting the location of gages 13 and 14' in Fig. 7, it will be seen that the circuit of Fig. 13 tends to compensate for the inherent non-linearity of a single buckled column and strain gage combination as illustrated in Fig. 6. If we imagine that knife edges 50 of Fig. 7 are moved apart by a little distance it is evident that buckling deflection of member 12 will increase while at the same time buckling deflection of member 12' will decrease. It will be seen that if strain gages 13 and 14' or gages 13' and 14 are connected into adjacent arms of a bridge circuit as shown in Figs. 12 or 13 the result is that the output of the bridge becomes much more nearly linear than with what would be obtained from one of the gages alone.

The principle which is common to all of Figs. 7 to 11 inclusive is the use of a tension link or member 11 which serves to pivotally connect or hinge component parts of the structure and at the same time carries the resultant of the buckling forces. The basic principle of my present invention represents a major advance over the extensometers I have previously disclosed. In order to give an idea of the results which can be obtained with such a structure the following data are given, although I do not wish to be limited in any way by these dimensions. In a design with which I experimented in my early tests, length L, Fig. 7, was 1 1/16", member 11 was 1/2" wide x .02" thick, members 12 and 12' were 1/2" x .015" steel straps, the ends being ground as shown to form knife edges. Height $h$ was 1/2" and distances $c$ and $c'$ were 1/4". Buckling deflections $b$ and $b'$ were approximately 1/8". Bonded wire strain gages were attached at 13 and 14' and the circuit of Fig. 13 was used in the test. Using a commercially available strain measuring instrument I found that I could readily measure on the reading dial a relative movement between the knife edges 50 as small as one one-hundred-thousandth (1/100,000) of an inch, and I could detect movements about one-third as great by watching the pointer of the instrument. Had I used the circuit of Fig. 12 with the same instrument the sensitivity would have been twice as high. I further found that the force required to produce a relative motion of 1/1000" between the knife edges 50 was approximately two and one-half ounces, a very considerable portion of which was due to the bending stiffness of member 11. Another interesting observation was that the knife edge friction or hysteresis in this extensometer was found to be very small when tested as a free element; i. e., when not clamped to a surface. This observation showed that the device was suitable not only for conventional extensometer applications but also for the weighing of small loads, torques, or forces under conditions of small deflection. The linearity of the device as used with the Fig. 13 circuit was found to be quite satisfactory for practical materials testing and load-weighing applications.

While the extensometer described above under Figs. 7 to 13 inclusive represents an excellent improvement over what has been available in the past and while it exhibits good sensitivity, low actuating forces, and negligible hysteresis, the overall effectiveness can be made still greater by the variation in the design of the buckling members which I shall now disclose. I here explain a principle in buckling which I effectively employ in my improved device for measuring loads, forces, torques, movements, or deflection.

In Fig. 14 I show a member 23, hinged at both ends, so arranged that load may be applied eccentrically. If to such a member a gradually increasing vertical load is applied, the member will at first shorten axially due to direct compression and will at the same time bow slightly as a result of the bending moment due to eccentric load. This action may be represented by line 6 of Fig. 5 which will be used to illustrate the action of the devices of Figs. 14 to 18. As load P is further increased a point 7 is finally reached at which the member goes into a state of buckling as illustrated in Fig. 15, the buckling being in such a direction as to increase the eccentricity of the load relative to the central part of the member 23. Further increase of load beyond point 7 results in a very much greater rate of axial deflection as indicated by line 16 of Fig. 5 which represents in simplified form the important characteristics of the buckling phenomenon. It will be noted that the slope of line 16, Fig. 5, is greater than that of line 8 which represents the action of a centrally loaded buckling member. That is to say, if member 27 of Fig. 1 and member 23 of Fig. 14 are of the same length and are so chosen that they both begin to buckle under the same load P at point 7, then the axial stiffness of member 23 will be greater than that of member 27. It is thus apparent that member 23 when buckled as shown in Fig. 15 is less advantageous in such a device as Fig. 7 than would be member 27 when buckled as shown in Fig. 2.

It is possible however to cause member 23 of Fig. 14 to buckle in the manner indicated in Fig. 16. This may be done by forcing member 23 to deflect in the manner shown in Fig. 16 until load P is made great enough to hold it in that position. It is to be especially noted that member 23 will not buckle as shown in Fig. 16 unless forced to do so—it is for this reason that I refer to such a buckled condition as "contrary buckling." Referring again to Fig. 5, that part of the diagram from the origin to point $a$ is missing because of the unstable nature of the initial stage of the buckling. From some point $a$ onward however a condition of stability exists and the relationship between P and axial deflection is indicated by lines 17 or 18, the slopes of which will depend upon the magnitude of the eccentricity $e$ of Fig. 14. This slope will be positive for small values of $e$, but for large values of $e$ it would, in accordance with the principles of my invention, become negative as indicated by line 18 of Fig. 5. Thus it is seen that by employing contrary buckling I can design a member which will exhibit arbitrarily small or even negative axial stiffness once buckling has been established. This means that if such a contrarily buckled member is substituted for members 12 and 12' in Fig. 7 the forces required to actuate knife edges 50 may be made arbitrarily small, or the device may even be made to be unstable so that it tends to collapse when disturbed slightly in either direction from its neutral position. It should be noted that, while I have shown double hinged buckling in Figs. 14 to 18 as an illustration, I can just as well apply the principle of contrary buckling under other end conditions, as will readily be seen.

It is important to realize that an unstable buckling condition such as is shown in line 18 of Fig. 5 may be and sometimes is of considerable practical value in connection with my present invention. This is apparent from examination of Fig. 7 where it will be seen that, so long as knife edges 50 are clamped against surface 51 so as to prevent slipping, it makes no difference whether or not the condition of buckled members 12 and 12' is a stable one. Normally of course it is preferred to have the overall structure stable merely as a matter of convenience. In order to explain why I may wish to use buckling members which exhibit the characteristic indicated by line 18 of Fig. 5 consider the overall stability of the particular structure shown in Fig. 7. Here the hinged member 11 is built into the end pieces 10 and therefore exerts a resistance to bending when knife edges 50 undergo a relative motion. It will be seen that by employing contrarily buckled members 12 having sufficient eccentricity to produce an unstable buckling condition, I can use this instability to offset some or all of the stable resistance of member 11. In this way I can produce a structure such that the forces required to produce relative motion between knife edges 50 become arbitrarily small.

In Fig. 17 I show a design for a buckling member which I have found particularly suited to my purpose. The member 24 is in the form of a thin strap, the thickness of which is reduced in the central portion where strain gages 5 are applied. The knife edges are preferably formed at one face of the strap as shown. Fig. 18 shows member 24 in a state of contrary buckling. The advantages of this particular design are its ease of manufacture and the fact that the bending is concentrated in the region where the strain is to be measured which results in higher sensitivity and improved linearity. In all the Figs. 14 to 18 inclusive the relationship between strain at gage 5 and axial deflection due to bending is essentially that shown in Fig. 6, except that the portion from the origin to some point $a$ would be omitted as was the case in Fig. 5.

In order to give an idea of the advantages to be gained by the use of my contrary buckling principle the following figures are taken from tests made on an extensometer built like Fig. 7 in which were inserted contrarily buckled steel members like that shown in Fig. 18. In this case, referring to Fig. 7, dimension L was $1\frac{1}{16}''$, dimensions $c$ and $c'$ were $\frac{1}{4}''$, $b$ and $b'$ were $\frac{1}{8}''$. The buckled members 12 and 12' were made in accordance with Fig. 17 with the following dimensions: $a=\frac{1}{16}''$, $b=.03''$, $t=.012''$, the width of the strap was $\frac{1}{4}''$. Strain gages were placed at 13 and 14' of Fig. 7. With this structure and the strain measuring instrument referred to above I found that I could measure with ease a relative motion between knife edges 50 of less than $\frac{1}{100,000}''$ and I found that an actuating force of only approximately one-third of an ounce at the knife edges would produce a relative motion of $\frac{1}{1000}''$. Of this $\frac{1}{3}$ ounce only approximately $\frac{1}{5}$ ounce was due to the stiffness of the buckled straps, the remainder being due to the bending resistance of hinged member 11 which in this test was a $\frac{1}{2} \times .013''$ steel strap. Thus it is seen that had I used a greater eccentricity by increasing dimension $b$ of Fig. 17 I could have made the actuating force arbitrarily small and could even have achieved a condition of instability had I so desired. In this test, using the circuit of Fig. 13, I found that the unbalance of the bridge as a function of the relative motion applied to knife edges 50 was linear to within 1% of $\frac{5}{1000}''$ for motions in either direction from zero to approximately $\frac{5}{1000}''$. Reproducibility was excellent and there was no detectable hysteresis. Such non-linearity as there was, being perfectly reproducible, could be taken into account so that a measuring accuracy of $\pm\frac{1}{100,000}''$ could be achieved over the entire useful range of the device as built which in this case was approximately $\frac{1}{100}''$. Measurements here described were relatively crude and there is every reason to believe that had I used a more sensitive indicating instrument and a more refined technique of determining the applied motions, I could have made measurements with this device which would be consistent to one or two millionths of an inch anywhere in its range.

While in Figs. 7 to 11 I show the buckling straps 12 as terminating in knife edge end conditions, I can of course use other end conditions within the scope of my invention and I may desire to do so in some instances. Thus, I may wish to eliminate mechanical knife edge friction entirely by use, as presently described, of built-in ends of my buckling members. Many other variations of detail in the application of my invention will, of course, be apparent to those skilled in the art from the principles and disclosures hereof.

So far I have disclosed my invention in connection with extensometers since that device provides a convenient means for visualizing the fundamental principles. It may be seen that the usefulness of this invention is much broader however and that it is by no means restricted to strain measurements in specimens, etc. The invention can in fact be used, as presently described, for measuring any small movements or deviations from a standard as in the case of a measuring machine or comparator. Or it can be equally useful for measuring any small loads, forces, or torques with small attendant displacements. The system of pivotally balanced buckling forces as exemplified in Figs. 7 to 11 inclusive is one of the important features of my invention and the contrary buckling principle as exemplified in Figs. 16 and 18 is a very desirable refinement of the sensitive element. While many practical applications may be made, I shall describe only a few merely to emphasize the broad range of usefulness.

In Fig. 19 I show by way of example a schematic weighing device in which the buckled elements 20 have built-in ends, i. e., ends fixed in a cooperating structure, and in which a tension member 11 acts as the frictionless hinge. Strain gages 5 serve to detect and measure forces or weights W applied through knife edge 26 to the load receiving portion 26' of the cooperating structure. Such a scale if properly designed is sensitive to exceedingly small forces which are associated with small motions and it is substantially devoid of friction and hysteresis.

Figs. 20 and 21 show schematically the application of my invention to a lateral extensometer or to a size-gaging device. Relatively rigid members 30 and 34 contact the member 29 through points 32 and screw 33. A crossed-spring (or Cardan) hinge 31 or similar device provides hinge action between members 30 and 34. Spring 36 causes the device to engage member 29 and a suitable form of stop such as a pin and slotted link 35 protects against excessive deflections. An extensometer indicated generally as 37 is actuated by the ends of members 30 and 34 through thin flexure plates 38. The device 37 might be for example that shown in Fig. 7 except that the knife edges 50 are preferably replaced by actuating hinges 38. It will be seen that the relative motion between points 32 and screw 33 is first magnified by the lever action of members 30 and 34, with the result that member 37 is able to measure exceedingly small relative motions between the actuating points 32 and 33. Fig. 21 shows a practical arrangement of the engaging point so as to assure stability against rocking. Obviously, many variations in details of this device are practical.

Fig. 22 shows a practical embodiment of my invention in the form of a suitably housed extensometer which is designed for convenient application. The basic extensometer element is indicated generally at 52 which for purposes of illustration is taken to represent the design shown in Fig. 7. A housing 53 serves as a protective cover for extensometer 52 and also as a means for transmitting the clamping force to the knife edges 50. Pins 21 which are more clearly shown in Figs. 7 and 8 extend through suitable slots or enlarged holes 54, Fig. 22, made in the two side walls of the housing 53 so that a clamping force applied at point 68 is transmitted through the pins to the knife edges 50 while still allowing sufficient freedom for the necessary motion of pins 21 resulting from relative motion applied to knife edges 50. A cover 67 which forms one of said side walls of the housing is removably attached to the body of the housing so that the insertion of extensometer 52 in and its removal from the housing 53 is made easy. Slot-shaped openings in the bottom of housing 53 allow the legs of extensometer 52 to protrude freely through the housing while at the same time serving as safety stops at points 46. It may be seen that the structure shown in Fig. 22 provides a rugged and lightweight means of support for the extensometer while at the same time permitting it to act with its full sensitivity and delicacy of measurement.

Also shown in Fig. 22 is a convenient means for affixing the combined structure to a surface 47 where strain is to be measured provided the material in question has magnetic properties. A magnet 49 which may be permanent or electromagnetic provides a holding force against the surface and a spring member 48 attached to the magnet bears against the extensometer housing at point 68 to provide suitable clamping force. Many other means of providing the holding force such as suction cups, cemented members, screws, etc., are well-known and hence need not be described.

Figs. 23, 24 and 25 show a conveniently adjustable light-weight clamping mechanism for engaging a specimen 55 under test with a pair of extensometers 53 of the type illustrated in Fig. 22. The clamping forces are provided by four parallel flexure plates 56 which are attached to the housings 53 indicated in Fig. 22. The other ends of members 56 are attached to an adjustable structure comprising an assembly of three primary members 57, 58 and 64 which are slidably nested with respect to each other. The left pair of flexure plates 56 is attached to channel-shaped member 57 in which slides another channel shaped member 58. A thumb screw 59 together with slot 60 in member 57 provides convenient coarse adjustment between members 58 and 57 so that the device can be used for a wide range of sizes of specimen 55. Sliding in member 58 is a rectangular-shaped member 64 at the upper end of which is attached the right pair of flexure plates 56. A cam 61 operated by lever 63 through spindle 62 provides for a controlled limited relative motion between members 64 and 58. Cam 61 is so designed that upon turning lever 63 through 180° the flexure plates 56 are sprung a sufficient distance to provide the desired clamping pressure as member 55 is engaged. A cover 65 may be attached to member 57 as shown. The adjustment of this device is made in the following manner: With lever 63 in the position shown by full lines thumb screw 59 is loosened and slid along slot 60 until knife edges 50 just contact specimen 55. Thumb screw 59 is then tightened, after which lever 63 is rotated 180° to provide the desired clamping force. Obviously, if for example a greater or smaller clamping force is desired, it is only necessary to make a corresponding allowance in positioning screw 59. When tests are to be made on several specimens of the same size it will be seen that only lever 63 needs to be manipulated to remove and reattach the assembly. The adjustment for members of different size is seen to be fast and simple and may be expedited by the use of a scale 70 on piece 57 and a reference mark such as arrow 70' on piece 58. While in materials testing it is generally desirable for averaging purposes to employ paired extensometers as illustrated in Figs. 23, 24 and 25, in many applications a single extensometer is adequate. In this case, one of the extensometers 53 is merely replaced by a suitable dummy member which bears against member 55.

Fig. 26 shows schematically the application of my invention to a beam balance detector. Member 39 is a balance arm of a platform scale or testing machine, the balancing weights 46 being suspended through knife edges in the conventional manner. Actuating member 42 is attached to member 39 so that any motion thereof is transferred to a balanced pair of load-sensitive buckling elements 41 which are supported between a fixed frame 43 and actuating arm 42. Stops 45 protect elements 41 from over-range. Instead of the detecting structure shown, I could of course use an arrangement like that shown in Fig. 7 or the arrangement shown at 37 and 38 in Fig. 20 for detecting movement of arm 39 relative to a fixed point. It may be seen that such a device will serve as a very sensitive balance detector which may be made to operate any usual and well-known electrical indicating means or controlling means. I have made measurements on a balanced buckling unit which would be suitable for such beam balance detecting service. I found that with the strain measuring instrument previously referred to I could easily detect a force of $1/20{,}000$ lb., the corresponding motion of the actuating point being only four millionths of an inch. This particular electronic instrument is not nearly so sensitive as others that were available. Not only did I achieve this sensitivity with a device which was rather crudely built, but I obtained a stability which permitted observations to this degree of sensitivity over long periods of time. This example does not by any means represent the ultimate but is given merely to show that I was able to do with a thoroughly practical and easily built unit.

It will be appreciated that my invention is also applicable for seismic or vibration pick-up operation, especially since it results in a device which is both rugged and highly sensitive to small forces or motions. This high degree of sensitivity also makes it suitable for electrostatic, magnetic, and electromagnetic forces. These and many other applications will be obvious to those skilled in the measurement art once by broad concepts are fully understood.

In Figs. 27 to 29, inclusive, I show how my extensometers may be used in pairs in order to measure either bending in a specimen or average axial strain in a specimen. In Fig. 27 two extensometers 80 and 81 of the identical type shown in Fig. 7 are arranged oppositely on a specimen 82. Strain gages 83 and 84 are shown for purposes of illustration and correspond to strain gages 13 and 14' of Fig. 7.

In Fig. 28 I show one of a number of practical circuits which are suited for measuring the bending strain in specimen 82 in Fig. 27 it being assumed that member 82 is bent in the plane of the paper. Since gages 83 are in opposite arms and gages 84 are in opposite arms of the bridge circuit, it is readily seen that the net unbalance of the bridge corresponds to the algebraic sum of the bending strains on the opposite sides of member 82. The bridge is fed by power source 85 which may be either D. C. or A. C. and suitable indicating or recording means 86 is used to measure the unbalance of the bridge.

In Fig. 29, I show one of several circuits which are suitable for measuring the average longitudinal strain of member 82 in Fig. 27. In this case strain gages 83 are connected in adjacent arms of the bridge and strain gages 84 comprise the remaining arms of the bridge which is powered by D. C. or A. C. source 85, the unbalance being measured by suitable indicator or recorder 86. The arrangement shown in Fig. 27, when used with the circuit of Fig. 29, or equivalent, is referred to as an averaging extensometer.

From the disclosure herein, it is seen that I have provided improved means for making measuring and weighing devices highly sensitive in response to very small actuating forces.

It will, of course, be understood by those skilled in the art that various changes may be made in the construction and arrangement of parts without departing from the spirit of the invention as set forth in the appended claims.

I claim:

1. Condition responsive apparatus comprising, in combination, two relatively movable elements for transmitting to the apparatus a condition external thereof, a member pivotally connecting said elements together and maintaining them in operative relation so that relative rotation occurs between said elements in response to a change of said external condition, a flexible column buckled in a state of elastic instability interposed between said elements so that rotation of said elements applies an end force to the column along its lengthwise axis and thereby effects a predetermined change of strain at one of the surfaces of the column as a result of a given change in the extent of its buckling, said movable elements supporting the column only at its ends at all times, a resilient element interposed between said movable elements and exerting forces on them to oppose the tendency of the column-buckling condition to pivotally move said elements, said pivotal connecting member being disposed to carry the resultant of the forces acting on the movable elements by said column and resilient element so that said apparatus is in self-contained equilibrium, and electrical impedance strain gage means connected to said buckled column to be responsive to changes of the buckling strains at the surface thereof, said resilient element comprising an additional buckling column opposing the buckling force of the first column.

2. Condition responsive apparatus comprising, in combination, two relatively movable elements for transmitting to the apparatus a condition external thereof, a member pivotally connecting said elements together and maintaining them in operative relation so that relative rotation occurs between said elements in response to a change of said external condition, a flexible column buckled in a state of elastic instability interposed between said elements so that rotation of said elements applies an end force to the column along its lengthwise axis and thereby effects a predetermined change of strain at one of the surfaces of the column as a result of a given change in the extent of its buckling, said movable elements supporting the column only at its ends at all times, a resilient element interposed between said movable elements and exerting forces on them to oppose the tendency of the column-buckling condition to pivotally move said elements, said pivotal connecting member being disposed to carry the resultant of the forces acting on the movable elements by said column and resilient element so that said apparatus is in self-contained equilibrium, and electrical impedance strain gage means connected to said buckled column to be responsive to changes of the buckling strains at the surface thereof, said resilient element comprising an additional buckling column opposing the buckling force of the first column and said columns having at least one of their ends built into at least one of the column supporting elements.

3. Condition responsive apparatus comprising, in combination, two relatively movable elements for transmitting to the apparatus a condition external thereof, a member pivotally connecting said elements together and maintaining them in operative relation so that relative rotation occurs between said elements in response to a change of said external condition, a flexible column buckled in a state of elastic instability interposed between said elements so that rotation of said elements applies an end force to the column along its lengthwise axis and thereby effects a predetermined change of strain at one of the surfaces of the column as a result of a given change in the extent of its buckling, said movable elements supporting the column only at its ends at all times, a resilient element interposed between said movable elements and exerting forces on them to oppose the tendency of the column-buckling condition to pivotally move said elements, said pivotal connecting member being disposed to carry the resultant of the forces acting on the movable elements by said column and resilient element so that said apparatus is in self-contained equilibrium, and electrical impedance strain gage means connected to said buckled column to be responsive to changes of the buckling strains at the surface thereof, said resilient element comprising another buckling column and the columns being disposed on opposite sides of the pivotally connecting member so that their buckling forces oppose each other.

4. Condition responsive apparatus comprising, in combination, a pair of flexible buckled columns adapted to have a predetermined change of strain in response to a given change in a condition external to the apparatus, relatively movable elements for supporting the columns only at their ends at all times, means for connecting said movable elements together for transmitting end forces to the columns along their lengthwise axes as a result of a change in the external condition, said columns being disposed on opposite sides of said connecting means so that the buckling action increases in one column and decreases in the other in response to the given change, and means responsive to changes of strain in said columns.

5. Condition responsive apparatus comprising, in combination, a pair of flexible buckled columns adapted to have a predetermined change of strain in response to a given change in a condition external of the apparatus, relatively movable elements for supporting the columns only at their ends at all times, means for connecting said movable elements together for transmitting end forces to the columns along their lengthwise axes as a result of a change in the external condition, said columns being disposed on opposite sides of said connecting means so that the buckling action increases in one column and decreases in the other in response to the given change, electrical impedance means responsive to changes of strain in each of said columns, and an electrical bridge circuit in which said impedance means constitute bridge arms arranged so as to compensate substantially for non-linearity of the changes of buckling strains in said columns in response to said condition.

6. Condition responsive apparatus comprising, in combination, a flexible buckled column having a sensitive action adapted to have a predetermined change of strain in response to a given change in the condition to which the apparatus is subjected, relatively movable elements for supporting said column only at its ends at all times, means for connecting said relatively movable elements together to maintain the same in operative relationship to each other so that said condition may be transmitted to said column, said column having at least one of its ends arranged to receive an axial load which is eccentric to the neutral axis of its said sensitive section when the column is in an unbuckled condition, and said column also being buckled contrary to its normal buckling tendency, and means responsive to changes of strain in the column.

7. Condition responsive apparatus comprising, in combination, two relatively movable elements for transmitting to the apparatus a condition external thereof, a member pivotally connecting said elements together and maintaining them in operative relation so that relative rotation occurs between said elements in response to a change of said external condition, a flexible column buckled in a state of elastic instability interposed between said elements so that rotation of said elements applies an end force to the column along its lengthwise axis and thereby effects a predetermined change of strain at one of the surfaces of the column as a result of a given change in the extent of its buckling, said movable elements supporting the column only at its ends at all times, a resilient element interposed between said movable elements and exerting forces on them to oppose the tendency of the column-buckling condition to pivotally move said elements, said pivotal connecting member being disposed to carry the resultant of the forces acting on the movable elements by said column and resilient element so that said apparatus is in self-contained equilibrium, said column supporting elements being provided with gage points at one of their ends, and means providing a housing for the condition responsive apparatus including means for supporting said apparatus by a connection between the housing and column supporting elements whereby a holding force applied to said housing can be transmitted to said column supporting elements to press their gage points into contact with a specimen whose deformation is to be measured.

8. Condition responsive apparatus comprising, in combination, two relatively movable elements for transmitting to the apparatus a condition external thereof, a member pivotally connecting said elements together and maintaining them in operative relation so that relative rotation occurs between said elements in response to a change of said external condition, a flexible column buckled in a state of elastic instability interposed between said elements so that rotation of said elements applies an end force to the column along its lengthwise axis and thereby effects a predetermined change of strain at one of the surfaces of the column as a result of a given change in the extent of its buckling, said movable elements supporting the column only at its ends at all times, a resilient element interposed between said movable elements and exerting forces on them to oppose the tendency of the column-buckling condition to pivotally move said elements, said pivotal connecting member being disposed to carry the resultant of the forces acting on the movable elements by said column and resilient element so that said apparatus is in self-contained equilibrium, said column supporting elements being provided with gage points at one of their ends, means providing a housing for the condition responsive apparatus including means for supporting said apparatus by a connection between the housing and column supporting elements whereby a holding force applied to said housing can be transmitted to said column supporting elements to press their gage points into contact with a specimen whose deformation is to be measured, means for applying said holding force including a frame having relatively movable parts and parallel flexure plates connecting said housing with one of said parts, and means whereby another of said parts is adapted to be brought into operative engagement with the side of a specimen opposite to that engaged by the gage points.

9. Condition responsive apparatus comprising, in combination, a pair of gage points, means for supporting both gage points on the same side of a specimen for movement relative to each other in response to strain in a specimen engaged thereby, means for engaging the specimen on the side thereof opposite to the side engaged by the gage points, a frame for connecting said gage supporting means and said opposite specimen engaging means whereby the gage points can be clamped to the specimen including yieldable means for biasing the gage points into contact with the specimen, said frame having three parts, means whereby two of said parts are adjustable to different fixed lengths to adapt the apparatus to a given size specimen and to adjust the clamping pressure of the gage points, said yieldable means being supported by the third part of said frame, and means for shifting said third part to apply or release the gage points to the specimen, the clamping force on the gage points being determined by said yieldable means.

10. The combination set forth in claim 9 further characterized in that said yieldable means comprises a plurality of parallel flexure plates.

11. Condition responsive apparatus comprising, in combination, a pair of gage points, means for supporting both gage points on the same side of a specimen for movement relative to each other in response to strain in a specimen engaged thereby, means for engaging the specimen on the side thereof opposite to the side engaged by the gage points, and a frame for connecting said gage supporting means and said opposite specimen engaging means whereby the gage points can be clamped to the specimen including a plurality of parallel flex plates whose respective ends are rigidly secured to each other to provide a flexible parallelogram operation of the flex plates for biasing the gage points into contact with the specimen.

ARTHUR C. RUGE.

References Cited in the file of this patent

UNITED STATES PATENTS

| Number | Name | Date |
|---|---|---|
| 1,389,341 | Blood | Aug. 30, 1921 |
| 2,077,598 | Von Heydekampf | Apr. 20, 1937 |
| 2,180,175 | Sivertsen | Nov. 14, 1939 |
| 2,208,635 | Johnson | July 23, 1940 |
| 2,292,326 | Lewis | Aug. 4, 1942 |
| 2,316,203 | Simmons, Jr. | Apr. 13, 1943 |
| 2,316,975 | Ruge | Apr. 20, 1943 |
| 2,332,136 | Dillon | Oct. 19, 1943 |
| 2,403,951 | Ruge | July 16, 1946 |
| 2,416,664 | Ruge | Feb. 25, 1947 |
| 2,419,061 | Emery | Apr. 15, 1947 |
| 2,439,146 | Ruge | Apr. 6, 1948 |
| 2,440,706 | Tint | May 4, 1948 |
| 2,458,354 | De Forest | Jan. 4, 1949 |
| 2,508,419 | Ramberg | May 23, 1950 |
| 2,581,264 | Levesque | Jan. 1, 1952 |

FOREIGN PATENTS

| Number | Country | Date |
|---|---|---|
| 289,203 | England | Apr. 26, 1928 |